Jan. 24, 1956 E. W. HULLEGÅRD 2,732,432
AUDIO-FREQUENCY SYSTEM
Filed June 25, 1952 2 Sheets-Sheet 1

INVENTOR
ERIK WALDEMAR HULLEGÅRD
BY Frederick E. Hane
ATTORNEY

ERIK WALDEMAR HULLEGÅRD
INVENTOR
BY [signature]
ATTORNEY

United States Patent Office 2,732,432

Patented Jan. 24, 1956

2,732,432

AUDIO-FREQUENCY SYSTEM

Erik Waldemar Hullegard, Stockholm, Sweden, assignor to Telefonaktiebolaget L M Ericsson, Stockholm, Sweden, a Swedish company Application June 25, 1952, Serial No. 295,480

Claims priority, application Sweden July 13, 1951

3 Claims. (Cl. 179—16)

Figure 1:
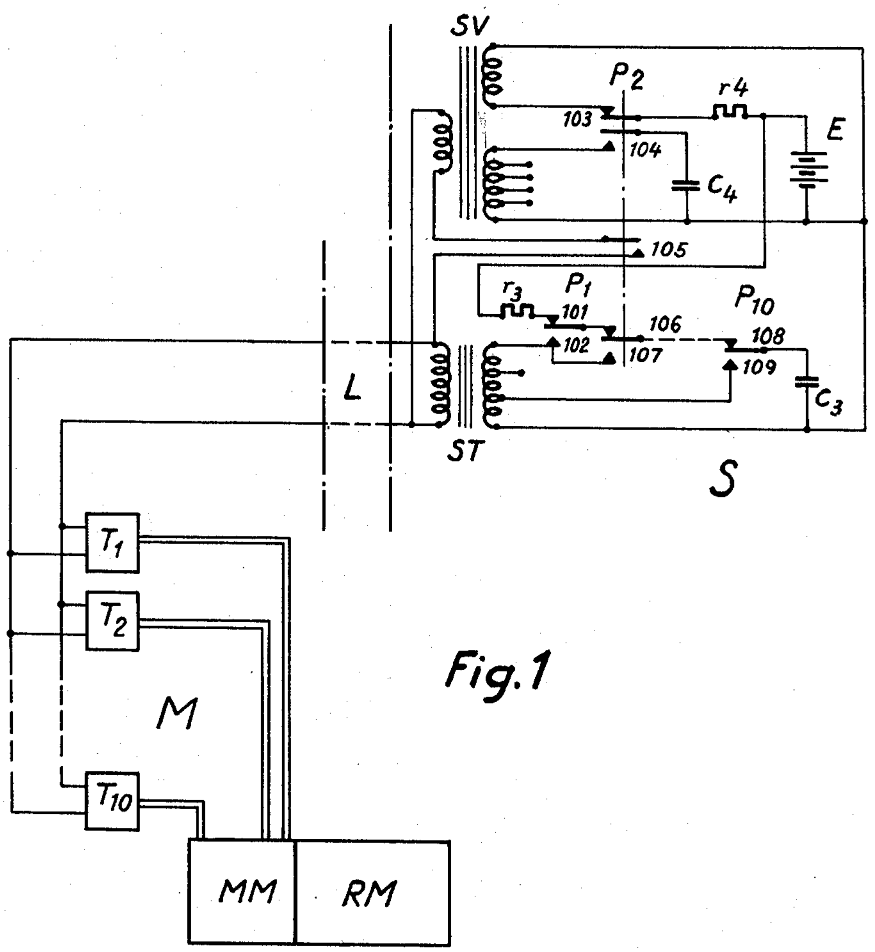

The present invention relates to automatic telephone systems and particularly to the sending of audio-frequency signals over telephone lines. The invention may be applied to subscriber lines as well as to junction lines. Specifically, the invention is suitable for number signals. When a number is chosen by means of audio-frequencies it is usual to connect one or more audio-frequency generators to the line at each signal. The audio-frequency generators may be common for a great number of lines. For signal emission from small exchanges, for example rural exchanges, and especially for audio-frequency emission from the subscriber's instrument, audio-frequency generators as heretofore known are too expensive to procure and to maintain.

The object of the present invention is to provide an audio-frequency system comprising a sender and a receiving device connected with a line, the sender of which is reliable at operation and furthermore cheap as well to procure as to maintain. This is obtained according to the invention by arranging a circuit comprising a battery and an energy storing impedance located in the sender, said impedance being loaded in said circuit, a transformer, one of the windings of which is during emission of a signal connected to the line on the emitting side and the other winding of which is simultaneously included in an oscillating circuit in the sender, and a number of switches, which when operated connect said impedance in said oscillating circuit, whereby the impedance is discharged and causes a damped oscillation, which in its turn produces an audio-frequency current on the line.

The invention will be more closely described below with reference to the accompanying drawings.

Figure 2:
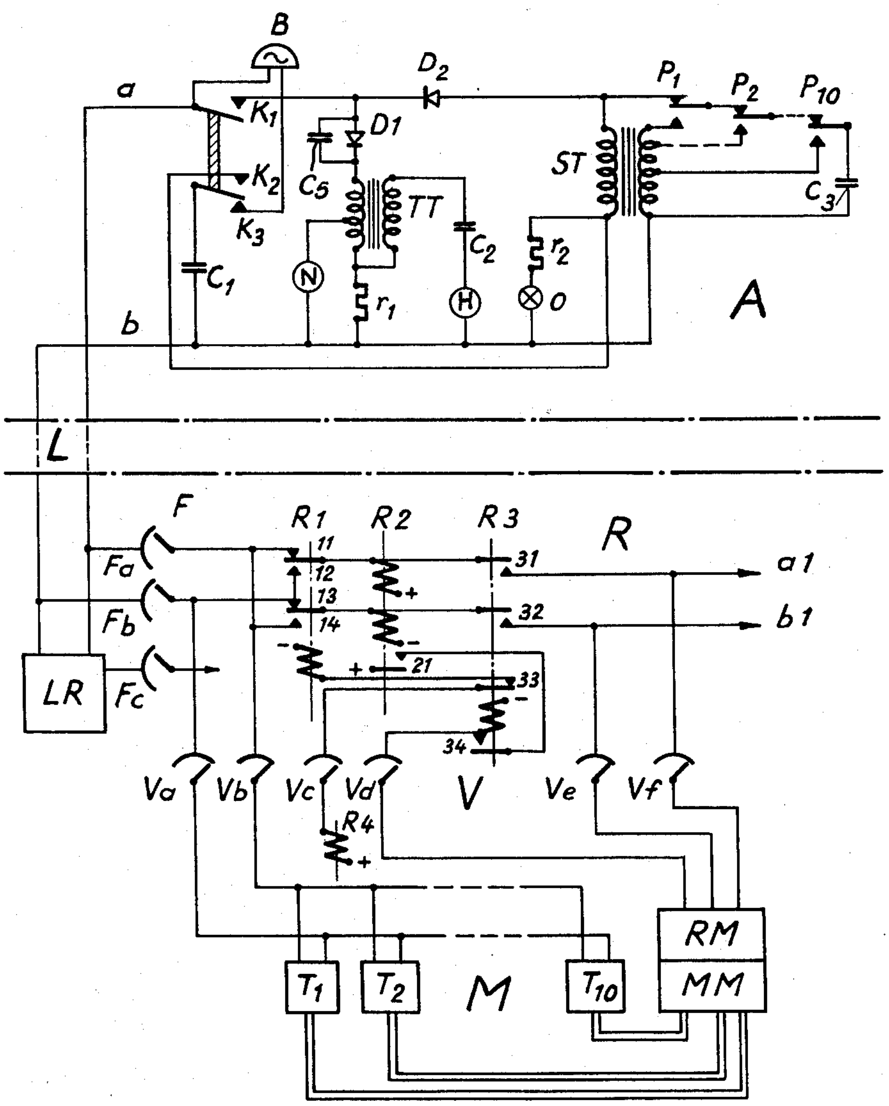

In the drawing:

Fig. 1 is a circuit diagram of an automatic telephone system according to the invention, and Fig. 2 is a circuit system showing the application of the invention to a subscriber's line.

In Fig. 1 S is a sender, M a receiving device and L a line. In the sender, there are ten switches P1–P10, two transformers ST and SV, a battery E and two condensers C3 and C4. The transformer SV and the condenser C3 act as energy storing impedances, which are kept loaded by the battery E in the following circuits:

(*a*) Battery E, resistance *r*3, contacts 101, 106—108, condenser C3.

(*b*) Battery E, resistance *r*3, contact 103, the upper right winding on transformer SV. The right winding on transformer ST and the lower right winding on transformer SV have a number of terminals for oscillating circuits with different frequencies.

The receiver includes ten filters T1–T10, a number of audio-frequency receivers MM and a registering means RM.

When the switch P1 is operated, the circuit (*b*) above is broken and the condenser C3 is connected to one of the terminals on the right winding of the transformer ST. As a result, an oscillating circuit is formed including the condenser C3, the contacts 102, 106—108 and the transformer ST. The condenser is discharged by means of a damped oscillation, during which an audio-frequency having the frequency of the oscillating circuit is transmitted to the receiver M over the line L, passes the filter T1, is amplified in the signal receiver MM and registered in the registering means RM. When the switch P1 is restored, the condenser C3 is recharged.

If instead the switch P10 is operated an oscillating circuit is closed, which comprises the condenser C3, the contact 109 and only part of the right winding of transformer ST. Said oscillating circuit produces an audio-frequency with a higher frequency, which passes through the filter T10 in the receiver M.

If the switch P2 is operated, two oscillating circuits with different frequencies are produced simultaneously. The contacts 104—105 close before contact 103 opens. The following oscillating circuits are closed:

(*a*) Condenser C4, contact 104, the right lower winding on transformer SV. When contact 103 opens the current through the right upper winding on transformer SV, the magnetic energy in the transformer SV is discharged through condenser C4. An audio-frequency having the frequency of the oscillating circuit is transmitted to the receiving device M and passes the filter T2.

(*b*) Condenser C3, contact 107, the right winding on transformer ST. An audio-frequency passing through the filter T2 is emitted.

In the audio-frequency receiver MM, the two signals are combined into one signal corresponding to the switch P2, which signal is registered in the registering means RM. In Fig. 2, A is a subscriber's instrument and M a register at an exchange. F is a line-finder with contact rows F*a*—F*c*, V is a registered-finder with contact rows V*a*—V*f* and R is a relay set with relays R1—R3. L is a subscriber's line with relay equipment LR. When the subscriber's instrument is inactive, the bell B of the subscriber's instrument is connected to line L over a condenser C1. When the handset is lifted, the switch contacts K1, K3 are operated, the bell B is disconnected and speech- and signalling means and connected over the contacts K1—K2. There are two circuits in the instrument, which are discriminated by the rectifiers D1—D2, and selected from the exchange by selection of the current direction on line L. In one of the circuits, there are the speech transformer TT of the subscribers' instrument with a microphone N and a receiver H connected in series with a condenser C2, and in the other one there is an audio-frequency generator consisting of a transformer ST, a condenser C3 and ten push buttons P1—P10. There are furthermore a signalling lamp O, a balance resistance *r*1 and a protecting resistance *r*2.

In the register M at the exchange, there are ten filters T1—T10, a number of audio-frequency receivers MM and a registering means RM.

Upon a call from the subscribers' instrument A, a circuit is closed from the relay set LR over wire *a*, contact K1, rectifier D1, transformer TT, microphone N and wire *b*. The line-fiinder F selects line L and the above-mentioned circuit is switched from a line relay in the relay set LR to the current feeding relay R2, which attracts its armature and closes contact 21.

Simultaneously, register M is connected over the register-finder V. Relay R1 attracts its armature in a circuit over the contact row V*c* and contact 33. The contacts 11—14 are operated. The current direction on line L is switched and a circuit is closed as follows: +, the upper winding on relay R2, contact 12, contact row F*b*, wire *b*, condenser C3, contacts P10—P2, P1, rectifier D2, contact K1, wire *a*, contact row F*a*, contact 14, the lower winding on relay R2, to negative. The condenser C3 is charged. The following two circuits are parallel with condenser C3:

(*a*) A lamp O connected in series with a resistance *r*2 and the left winding on transformer ST. The lamp O lights.

(*b*) Condenser C1, contact K2, the left winding on transformer ST. When the lamp O lights the subscriber may operate his key set P1 to P10. For each figure one of the push buttons P1—P10, for example P1, is pressed down. The condenser C3 is discharged by means of a damped oscillation through the right winding of transformer ST. An audio-frequency current is emitted over condenser C1 on line L, passes the contact rows F*a*—F*b* and V*a*—V*b* and one of the filters T1—T10, is received by the audio frequency receivers MM and registered in the registering means RM. When the push button P1 is released, the condenser C3 is charged anew.

After the frequencies corresponding to the necessary number of figures has been transmitted, the registering means RM sets up a communication by means of circuits over the wires *a*1—*b*1 and the contact rows V*e* and V*f*. Before the register is released, relay R3 is actuated in a circuit over the contact row V*d*. The contacts 31—34 are operated. Relay R1 releases its armature and the current direction on line L is again switched. Rectifier D2 now isolates transformer ST and rectifier D1 connects transformer TT. The lamp O is extinguished.

Instead of optical signals by means of the lamp O accoustical signals emitted from the register M can be used if a small condenser C5 is connected in parallel with rectifier D1, as shown in Fig. 2.

I claim:

1. In an automatic telephone system, the combination of a sender, a telephone exchange, a two wire line connecting said sender with said exchange, a receiver at said exchange including a plurality of filters tuned for different frequencies, a registering device at said exchange connected with said receiver, switch means connecting said line to said receiver, a transformer in said sender having at least two windings, switch means for connecting one of said windings to said line, a condenser in said sender including connections with said line, a power source for charging said condenser, and means for connecting said charged condenser across the other winding of said transformer to generate an alternating current signal, said signal being transmitted over said line to said receiver and registering device through one of said filters corresponding to the frequency of said signal.

2. In an automatic telephone system, a subscriber's instrument, a telephone exchange including a source of current, a two wire line connecting said instrument and said exchange, a receiver in said exchange including at least two resonant circuits tuned to different frequencies, a registering device at said exchange interconnected with said receiver, means at said exchange for connecting said line to said receiver in response to a call from said instrument, a sender in said instrument including capacitance means connected through said line with said source of current for charging thereby, a transformer having at least two windings and at least two switches for connecting said charged capacitance means through said transformer windings to said line so as to generate different oscillatory signals, the frequencies of said signals, each corresponding to the frequency of one of said resonant circuits whereby said signals are channeled to the receiver and the registering device through their respective resonant circuits and said registering device responds to said signals to select the called line corresponding to said signals.

3. In an automatic telephone system according to claim 2 wherein the said instrument includes at least two parallel circuits each including a series connected rectifier, one of said circuits comprising a microphone and a subscriber's receiver and the other circuit including said sender, said rectifiers being connected to pass current in one direction through the one circuit and in the other direction through the other circuit and wherein the said exchange includes means for changing the direction of current in said instrument each time the receiver at said exchange is connected to and disconnected from said line.

References Cited in the file of this patent

UNITED STATES PATENTS

| | | |
|---|---|---|
| 2,228,113 | Hersey | Jan. 7, 1941 |
| 2,317,191 | Holbrook | Apr. 20, 1943 |
| 2,554,201 | Lundkuist | May 22, 1951 |